(12) United States Patent
Kotani et al.

(10) Patent No.: US 6,717,387 B2
(45) Date of Patent: Apr. 6, 2004

(54) GENERATOR APPARATUS

(75) Inventors: Yoshiaki Kotani, Saitama (JP); Tomoki Fukushima, Saitama (JP); Tsutomu Wakitani, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 25 days.

(21) Appl. No.: 09/946,687

(22) Filed: Sep. 6, 2001

(65) Prior Publication Data

US 2002/0036483 A1 Mar. 28, 2002

(30) Foreign Application Priority Data

Sep. 26, 2000 (JP) ........................ 2000-292423

(51) Int. Cl.[7] ............. H02H 7/06; H02P 11/00; H02P 9/00; H02P 9/10
(52) U.S. Cl. .............. 322/28; 322/45; 322/75
(58) Field of Search ............. 322/45, 75, 24, 322/28, 26

(56) References Cited

U.S. PATENT DOCUMENTS

| | | | | | |
|---|---|---|---|---|---|
| 4,445,167 A | * | 4/1984 | Okado | ................ | 363/56.02 |
| 4,734,626 A | * | 3/1988 | Sutrina et al. | ................ | 318/76 |
| 4,877,388 A | * | 10/1989 | Inaba et al. | ................ | 425/150 |
| 4,908,565 A | * | 3/1990 | Cook et al. | ................ | 322/10 |
| 5,058,710 A | * | 10/1991 | Iwasa | ................ | 187/290 |
| 5,070,290 A | * | 12/1991 | Iwasa et al. | ................ | 318/758 |
| 5,083,077 A | * | 1/1992 | Wallace et al. | ................ | 322/32 |
| 5,710,699 A | * | 1/1998 | King et al. | ................ | 363/132 |
| 5,737,197 A | * | 4/1998 | Krichtafovitch et al. | ................ | 363/17 |
| 5,920,138 A | * | 7/1999 | Clifton et al. | ................ | 310/90.5 |
| 6,175,217 B1 | * | 1/2001 | Da Ponte et al. | ................ | 322/19 |
| 6,274,945 B1 | * | 8/2001 | Gilbreth et al. | ................ | 290/52 |
| 6,486,639 B1 | * | 11/2002 | Montret et al. | ................ | 322/29 |

FOREIGN PATENT DOCUMENTS

| | | |
|---|---|---|
| JP | 8-182192 | 7/1996 |
| JP | 11-308896 | 11/1999 |

* cited by examiner

*Primary Examiner*—Nicholas Ponomarenko
*Assistant Examiner*—Julio Cesar Gonzalez
(74) *Attorney, Agent, or Firm*—Westerman, Hattori, Daniels & Adrian, LLP

(57) ABSTRACT

A generator apparatus such as in a cogeneration system has a controlling power supply energized with its generator output with giving no adverse effect on the waveform of its output. An inverter 13 is provided for converting an alternating current output of the engine generator 10 into a direct current and returning back by the action of its inverter circuit 133 to an alternating current of a predetermined frequency which is then connected to a power supply system 14. While the engine 11 remains not actuated, a power received from a joint between the inverter 13 and the power supply system 14 is rectified by a rectifier 141 and transferred to the controlling power supply 140. When the engine 11 is started, the power at the input of the inverter circuit 133 is transmitted to the controlling power supply 140. As the voltage at the input of the inverter circuit 133 is set higher than that at the power supply system side, the energization of the controlling power supply 140 with the power at the input of the inverter circuit 133 can automatically be selected after the start-up of the engine.

4 Claims, 3 Drawing Sheets

GENERATOR APPARATUS

BACKGROUND OF THE INVENTION

1. Field of the Invention

The present invention relates to a small generator apparatus for a domestic or household use cogeneration system which has an interconnection function arranged connectable to a power system.

2. Description of the Related Art

As the demand for global environmental protection has broadly been increased, cogeneration systems and dispersion-type power supply systems are now focused for domestic use power generator systems. Those cogeneration systems and power supply systems are interconnected with a commercial power supply system for gaining the operational efficiency. For example, disclosed in Japanese Patent Laid-open Publication (Heisei) 8-182192 is a system which feeds a load with power from both the commercial power supply system and a domestic use generator. More particularly, as the voltage at an output terminal of the generator is set to a level higher than the commercial power supply voltage, it can be consumed prior to the commercial power supply voltage.

In such a conventional generator apparatus, the output of the generator is used as a controlling power supply for controlling the operation of an engine for power generation and the action of an inverter which converts a DC output of the generator into an AC output.

The power output serving as the controlling power supply is merely a portion of the output of the generator. In case that a small generator in a small-output generator system is driven by a gasoline engine or a gas engine for producing an output of 1 kw to 2 kw, the power consumption for controlling the power supply may be a large portion of the output of the generator. As a result, the influence of a switching regulator as a load for the controlling power supply will appear in the form of a waveform distortion of the output of the system which is not negligible.

FIG. 3 is a schematic diagram of a conventional household generator system. A generator 100 is connected to a commercial power supply system 110 while a controlling power supply 120 for controlling the operation of the household generator system is connected to both the generator 100 and the commercial power supply system 110. The controlling power supply 120 supplies each load 130, such as an electric component for the engine or an inverter in the generator 100, with control power.

FIGS. 4A–4C are diagrams showing the waveforms of various components in the generator system. The output current A of the household generator 100 is a sine wave having no distortion (as shown in FIG. 4A). The input current B of the controlling power supply 120 includes harmonic components and is not a sine wave (as show in FIG. 4B). As a result, the current C fed against the stream of the commercial power supply system has a composite waveform deformed by superimposing the distorted sine wave current B over the normal sine wave current A (as shown in FIG. 4C). As it is desired that the current fed in reverse to the commercial power supply system is a normal sine wave including no harmonics, its distortion components have to be eliminated.

SUMMARY OF THE INVENTION

The present invention has been developed in view of the foregoing drawback and its object is to provide a generator apparatus of which the quality of the power output is free from being affected by an output of a generator transferred to a controlling power supply.

As a first feature of the present invention, a generator apparatus having a generator driven by an engine and an inverter for converting an alternating current of the output of the generator into a direct current and driving an inverter circuit to convert the direct current into an alternating current of a predetermined frequency, the inverter connected at its output to a power supply system, comprising a controlling power supply for controlling the engine and the inverter, a first power supply link for rectifying and supplying to the controlling power supply a level of electricity received from the interface between the inverter and the power supply system while the engine remains not actuated, and a second power supply link for supplying the controlling power supply with a level of electricity received from the input of the inverter circuit when the engine has been started, wherein the switching from the first power supply link to the second power supply link is automatically carried out when the voltage at the input of the inverter circuit is increased to a target level.

According to the first feature, as the controlling power supply is supplied with the power at the input of the inverter circuit after the start-up of the engine, it will hardly give adverse effects on the waveform of the output of the inverter circuit. This allows the power supply system to receive a favorable waveform of the current from the output of the inverter circuit.

As a second feature of the present invention, the generator apparatus may be modified wherein the second power supply link is arranged to join with a rectified output of the first power supply link and has a diode provided with its forward direction aligned with the joining direction. According to the second feature, no current is allowed to flow from the first power supply link to the second power supply link and the input of the inverter circuit will hardly become unstable.

As a third feature of the present invention, the generator apparatus may be modified wherein the target level of the voltage at the input of the inverter circuit is set higher than the supply voltage of the first power supply link. According to the third feature, when the voltage at the input of the inverter circuit reaches the target level, the supply can automatically be switched to the second power supply link by the effect of a difference in the voltage between the first and second power supply links.

DETAILED DESCRIPTION OF THE PREFERRED EMBODIMENTS

Figure 1:
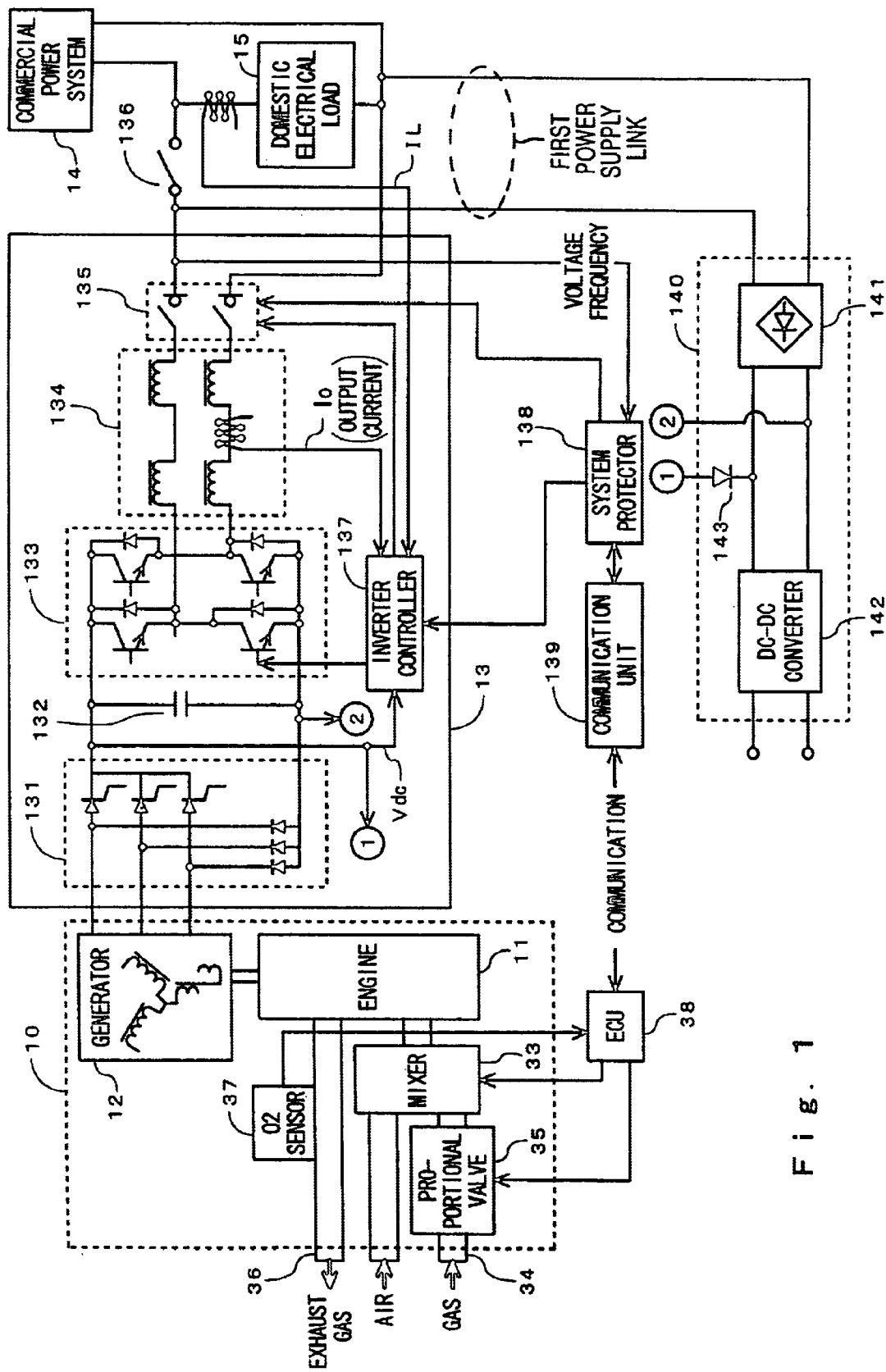
FIG. 1 is a block diagram of an arrangement of a cogeneration system as an example of the generator apparatus showing one embodiment of the present invention.

One embodiment of the present invention will be described in more detail referring to the relevant drawings. FIG. 1 is a block diagram of the engine generator apparatus. As shown, an engine operated generator 10 comprises an engine 11 and a generator 12. The generator 12 is driven by the engine 11 for generating an alternating current output responding to the number of revolutions. The generator 12 comprises a rotor joined to the engine 11 and a stator on which three phase windings are wound. The output terminal of the three phase windings is connected with an inverter unit 13. The inverter unit 13 converts the alternating current output of the generator 12 into an alternating current of the quality equivalent (in voltage, frequency, noise, and other factors) to that of the commercial power supply, then the output is connected to the commercial power system as timed in phase with the same of the system.

More specifically, the inverter unit 13 comprises a converter 131 for converting the alternating current output of the generator 12 into a direct current, a capacitor 132 an inverter circuit 133 for converting the direct current received from the converter 131 into an alternating current with the frequency and the voltage of the commercial power system, a filter circuit 134, and a connector relay 135. The alternating current output of the inverter unit 13 is connected by the connector relay 135 and a main switch 136 to the commercial power system 14 and also to a domestic electrical load 15 (for example, in a private use power system).

Also, the inverter unit 13 includes an inverter controller 137 for switch controlling the FET of the inverter circuit 133. The inverter controller 137 are arranged responsive to an output current Io, an output voltage Vdc of the converter circuit 131, and a signal from a system protector 138 for controlling the switching action of the connector relay 135 as providing a function for protecting the inverter circuit 133.

The inverter controller 137 monitors a load current IL of an electric load 15 constantly and controls the action of the inverter circuit 133 so that the output current Io and the load current IL are equal to each other. When the load current IL is increased, the inverter controller 137 gradually increases the output current Io to inhibit hunting and stall of the engine 11. When the load current IL is decreased, the inverter controller 137 quickly prevents a reverse current from the commercial power supply system.

The system protector 138 monitors the voltage and frequency of the output of the generator 12 and if the voltage or the frequency is different from the reference level or the failure of the power supply is occurred, generates and supplies an error signal to the inverter controller 137 which in turn open the connector relay 135 thus release the parallel operation to protect the system. Failure in the power supply may be judged from jumping in the phase of the system. Alternatively, while the inverter output is periodically shifted in the phase, the failure maybe judged from a degree of phase shift. The inverter controller 137 includes a nonvolatile memory such as an EEPROM for storage of data of the failure and data of the (unusual) stop motion when the failure takes place in the inverter unit 13 or the commercial power system 14.

The connector relay 135 is closed to connect the inverter unit 13 for parallel operation and is opened to disconnect the inverter unit 13 for parallel off. In addition, the connector relay 135 serves as a disconnector for protection of the system and is opened instantly when the system has a fault. The switching action of the connector relay 135 is controlled by the inverter controller 137 and the system protector 138, either may be implemented by a microcomputer. The connector relay 135 remains opened (parallel operation is released) when the main switch 136 is disconnected.

An ECU 38 is provided for controlling the engine 11. When the connector relay 135 is kept opened at a predetermined length of time, the ECU 38 generates a stop signal to stop the engine 11. The ECU 38 hence includes a nonvolatile memory such as an EEPROM for storage of data of the fault or data of the stop motion by the fault as well as a display such as an LED for displaying the fault. A communications unit 139 is provided between the ECU 38 and a combination (which may be referred to as an inverter side opposite to the ECU side) of the inverter controller 137 and the system protector 138 for communication of each state of both sides.

The driving power supply for the engine generator 10 and the controlling power supply for the inverter 13 are supplied from a controlling power supply 140. The controlling power supply 140 comprises a rectifier 141 and a DC-DC converter 142 connected to the output of the rectifier 141. The input of the rectifier 141 is connected to the output of the inverter 13 or the commercial power supply system 14. The output of the DC-DC converter 142 at the output of the rectifier 141 is connected to the output of the converter 131 or the input of the inverter circuit 133. Also, the input of the inverter circuit 133 is connected via a diode 143 to the output of the rectifier 141.

The engine 11 is supplied with a mixture of air and gas fuel produced by a mixer 33. A proportional valve 35 is provided across a gas intake tube 34 and its opening can determine the air-fuel ratio. The mixture of air and gas fuel is combusted in the engine 11 and exhausted from an exhaust tube 36. An oxygen sensor 37 is provided across the exhaust tube 36. In response to the density of oxygen detected by the oxygen sensor 37, the ECU 38 drives the proportional valve 35 to set the air-fuel ratio to theoretical air-fuel ratio for complete combustion.

Waste heat of the cogeneration system which is generated by the operation of the engine generator 10 is recovered by a heat exchange action of a heat recovery apparatus not shown. More specifically, the energy of heat is transferred to a heat utility apparatus such as a hot water storage tank using the cooling water as a medium which runs through the heat recovery apparatus. The heat utility apparatus is not related to the present invention and it will be explained in no more detail.

Figure 2:
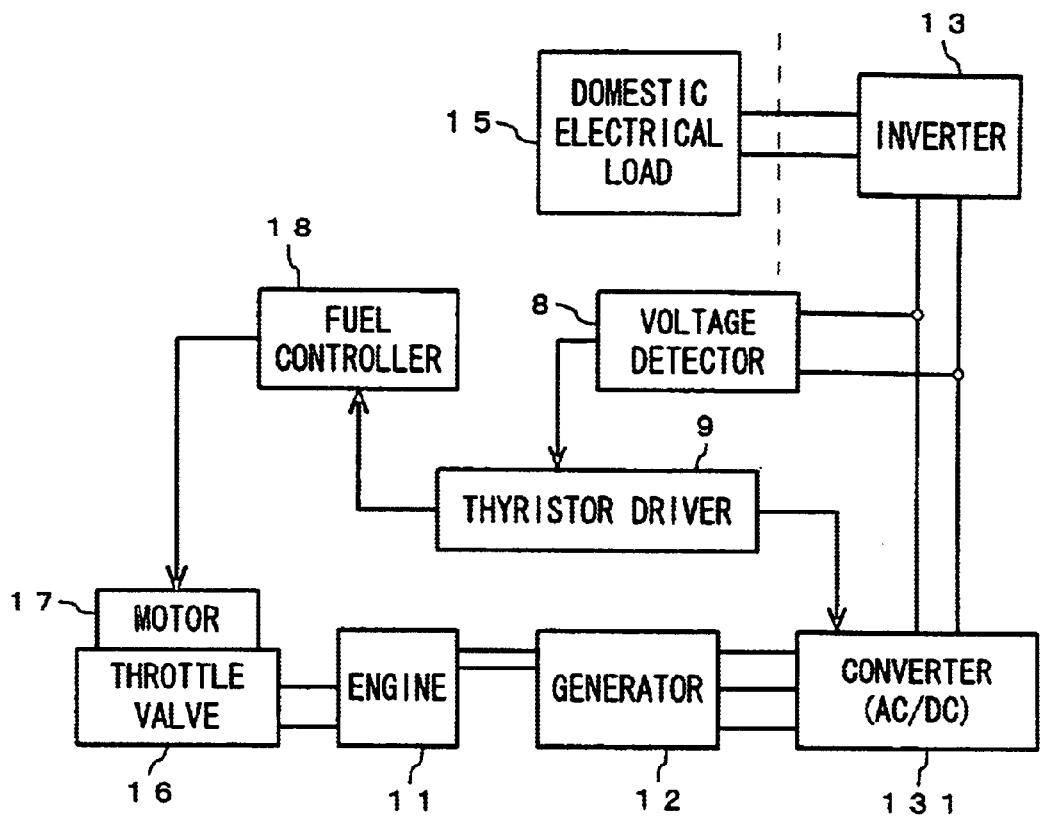
FIG. 2 is a block diagram explaining the action of a converter in the system.
Figure 3:
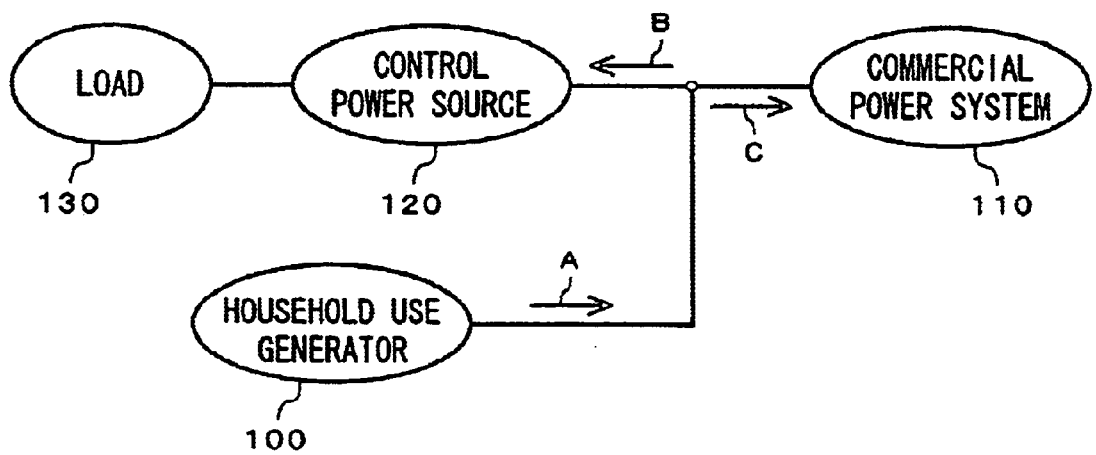
FIG. 3 is a schematic diagram of a conventional generator apparatus.
Figure 4A:
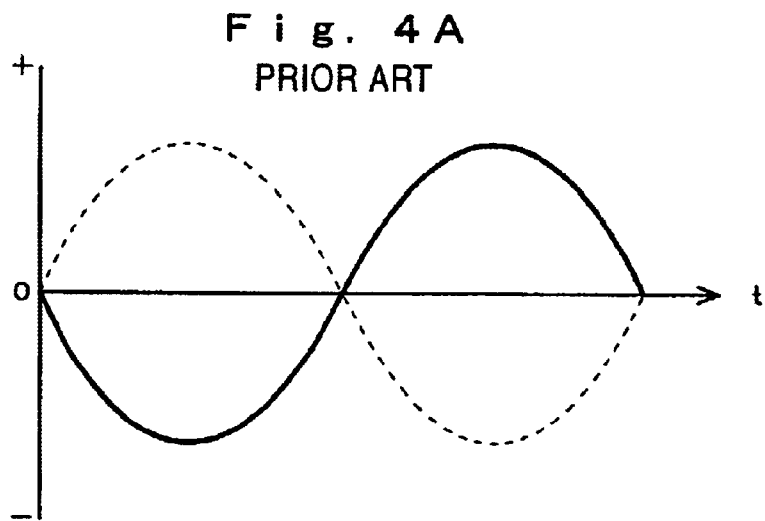
FIGS. 4A–4C are diagrams showing the waveforms of currents at the components of the conventional generator apparatus.
Figure 4B:
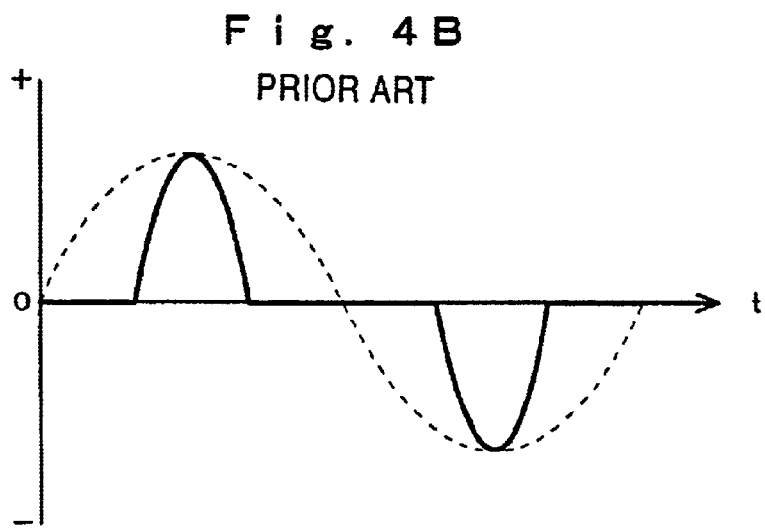
Figure 4C:
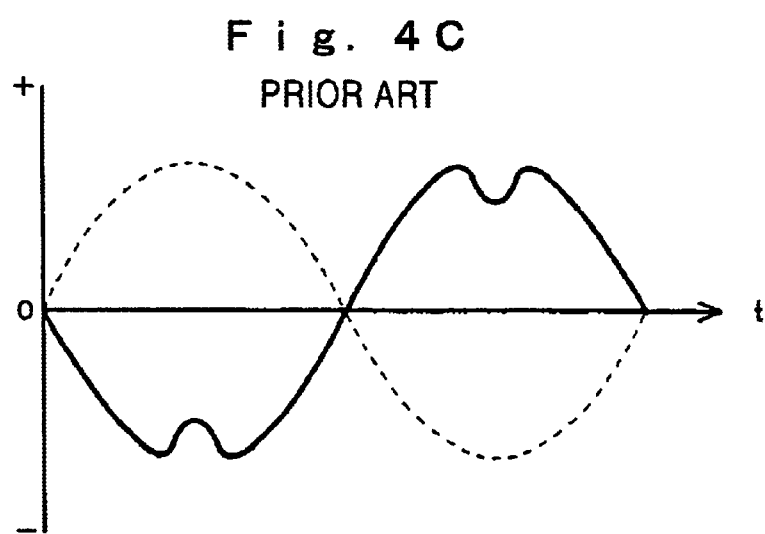

The function of maintaining the output voltage Vdc of the converter circuit 131 to a predetermined level will now be described. This function is executed by the ECU 38. As shown in FIG. 2, the output voltage Vdc of the converter circuit 131 is detected by a voltage detector 8. The output voltage Vdc of the converter 131 is compared with a target level (for example, 400 V) by a thyristor driver 9 which in turn controls the conduction of a thyristor in the converter circuit 131 so that the output voltage Vdc is equal to the target level using a known method. This allows the output voltage Vdc of the converter circuit 131 to remain at the target level. The target voltage is determined higher than the voltage at the output of the inverter 13 or a rectified level of the commercial power supply voltage produced by the rectifier 141.

A fuel controller 18 measures the conduction angle of the thyristor determined by the thyristor driver 9 and examines from the measurement whether or not the generator 12 runs properly with a comfortable margin. The action of a motor 17 is controlled depending on the size of the margin. If the margin is small, the opening of a throttle valve 16 of the engine 11 is increased to raise the engine speed. When the margin is favorable, the opening of the throttle valve 16 is decreased to lower the engine speed. This permits the generator 12 to be drive at a constant rate. One preferable controller for maintaining the output voltage Vdc to a desired level is illustrated in Japanese Patent Laid-open Publication (Heisei)11-308896.

The controlling process of an input to the controlling power supply 140 will be described referring to FIG. 1. As shown in FIG. 1, with the engine 11 not be actuated, the output voltage Vdc of the converter circuit 131 to be applied to the input of the DC-DC converter 142 is zero. The DC-DC converter 142 is hence supplied with a direct current converted by the rectifier 141 from an alternating current of the commercial power supply system 14. As the controlling power supply 140 is fed with the voltage directly from the commercial power supply system 14, no battery is needed for starting the engine 11 or providing control signals.

Once the output voltage Vdc of the converter circuit 131 increases to higher than the voltage supplied from the commercial power supply system 14 via the rectifier 141 to the DC-DC converter 142 after the start-up of the engine 11, its difference permits the DC-DC converter 142 to receive a current from the output of the converter circuit 131. As a result, the current transferred from the commercial power supply system 14 via the rectifier 141 to the DC-DC converter 142 becomes zero and the controlling power supply 140 can be fed with a voltage from the engine generator 10.

Because of the action of a diode 143, the current received from the commercial power supply system 14 and rectified by the rectifier 141 will not flow into the inverter 13.

When the output voltage Vdc has been increased to a desired level after the start-up of the engine 11, a portion of the output of the generator 12 can be supplied as a controlling power without affecting the output of the inverter 13 at the side of the commercial power supply system 14. Also, the power supply to the controlling power supply 140 can automatically be switched from one source to another before and after the engine 11 being started and shifted to a constant running state.

As set forth above, the features of the present invention are defined in claims 1 to 4 where the controlling power supply is provided from the commercial power supply system when the engine remains not actuated, hence eliminating the need of an extra source such as a battery for starting the engine. Accordingly, no maintenance for the battery will be necessary. Also, once the engine is started, a portion of the output of the generator can be used as a controlling power output without giving any adverse effect such as waveform distortion.

What is claimed is:

1. An apparatus having a generator driven by an engine and an inverter unit comprising a converter for converting an alternating current of the output of the generator into a direct current and an inverter circuit for converting the direct current into an alternating current of a predetermined frequency, the inverter unit connected at its output to a power supply system, comprising:

a controlling power supply for controlling the engine and the inverter unit;

a first power supply link for rectifying and supplying to the controlling power supply a level of electricity received from the power supply system while the engine remains not actuated; and a second power supply link for supplying the controlling power supply with a level of electricity received from the input of the inverter circuit when the engine has been started, wherein the switching from the first power supply link to the second power supply link is automatically carried out when the voltage at the input of the inverter circuit is increased to a target level.

2. The apparatus according to claim 1, wherein the second power supply link is arranged to join with a rectified output of the first power supply link and has a diode provided with its forward direction aligned with the joining direction.

3. The apparatus according to claim 1, wherein the target level of the voltage at the input of the inverter circuit is set higher than the supply voltage of the first power supply link.

4. The apparatus according to claim 2, wherein the target level of the voltage at the input of the inverter circuit is set higher than the supply voltage of the first power supply link.

* * * * *